United States Patent Office 3,281,325
Patented Oct. 25, 1966

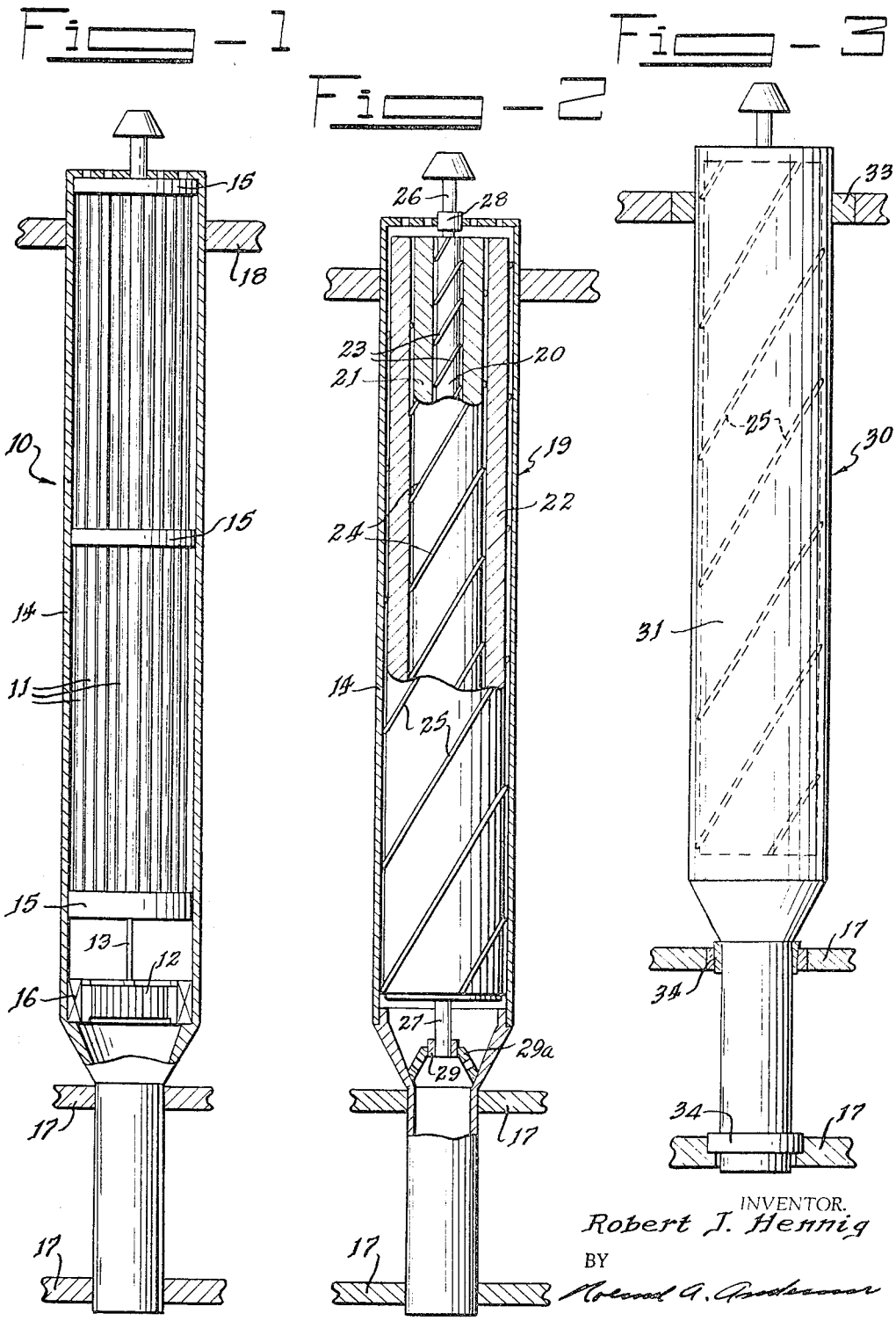

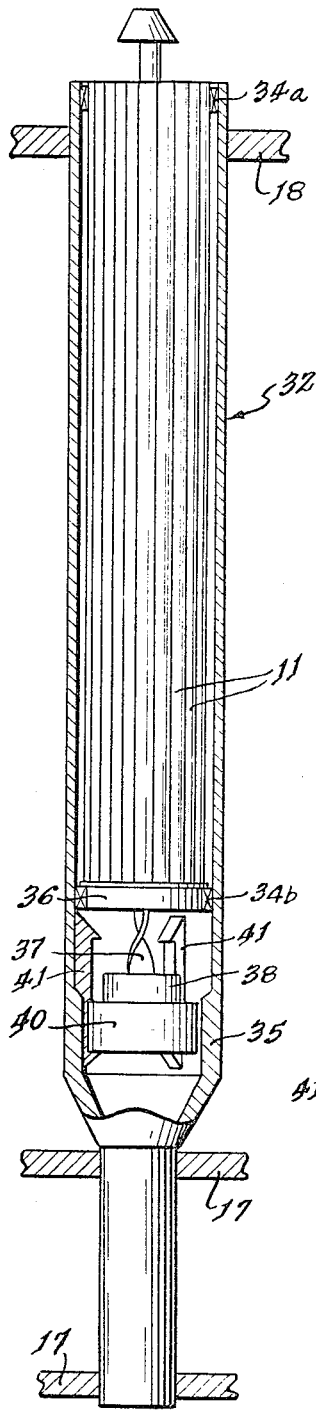
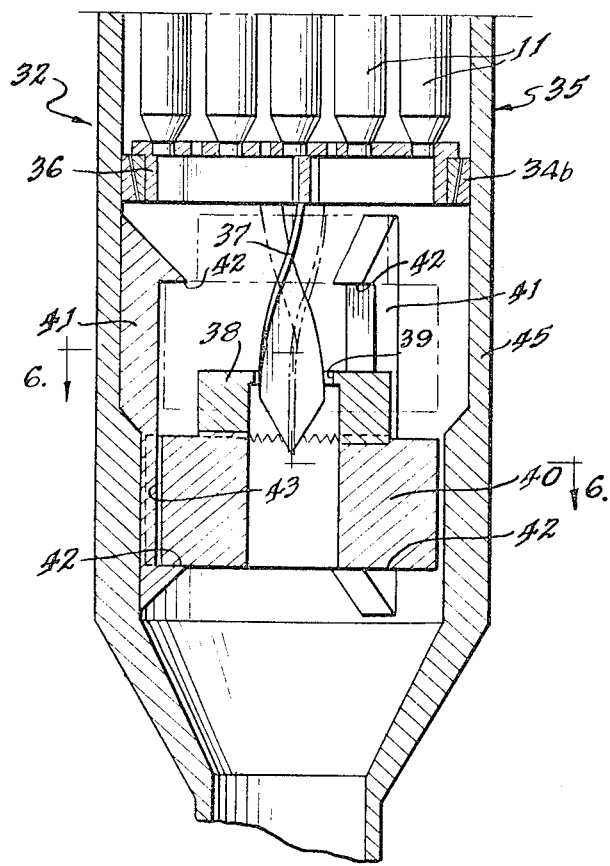
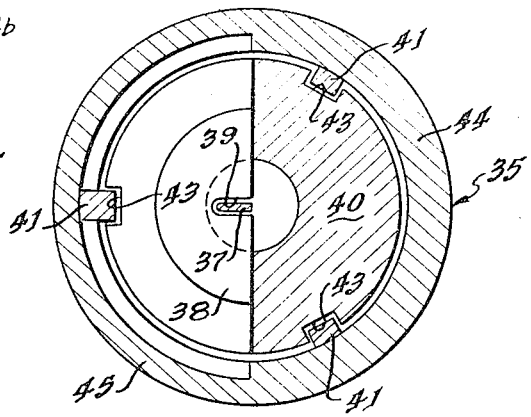

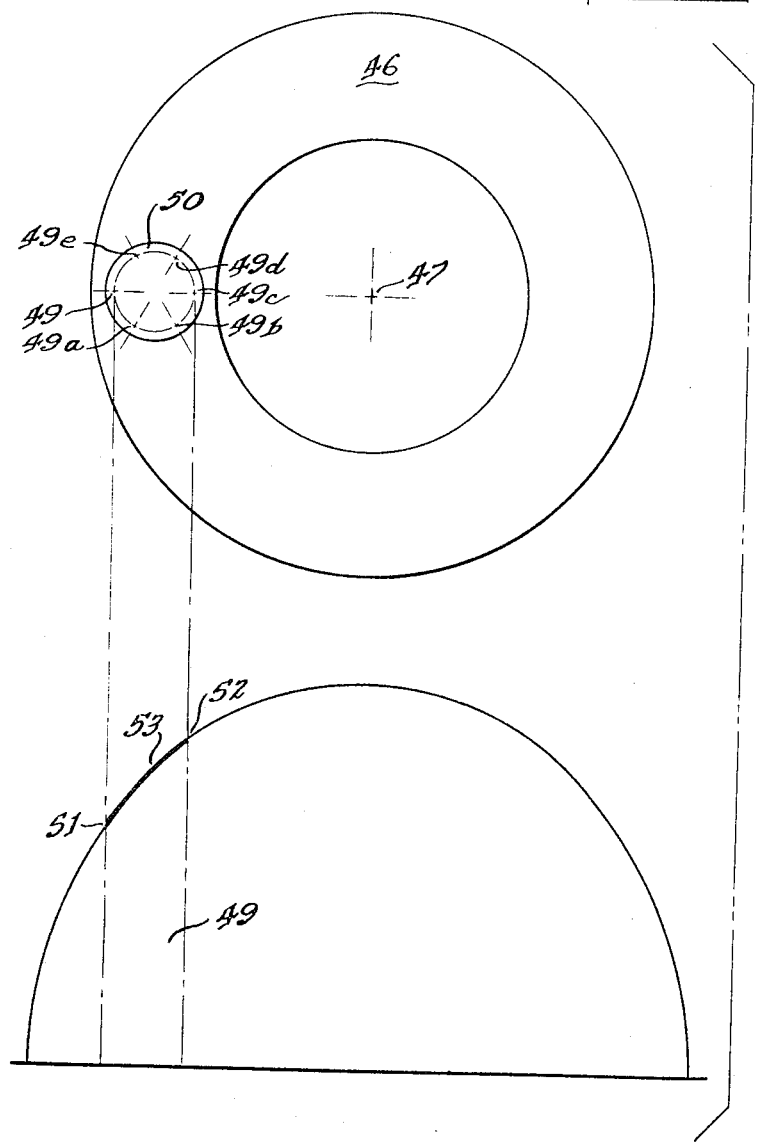

3,281,325
MINIMIZING THE EFFECTS OF FLUX GRADIENT
IN A REACTOR
Robert J. Hennig, Richland, Wash., assignor to the United
States of America as represented by the United States
Atomic Energy Commission
Filed Apr. 30, 1965, Ser. No. 452,416
3 Claims. (Cl. 176—12)

The invention described herein was made in the course of, or under, a contract with the United States Atomic Energy Commission.

This invention relates to an arrangement for shifting nuclearly reactive members in a reactor to minimize the effects of the radial gradient of the neutron flux in the reactor.

In many nuclear reactors, particularly those of the fast type, the neutron flux when considered along a radius of the reactor decreases from a maximum at the center generally in accordance with a sine curve. The farther from the reactor center, the greater the decrease in neutron flux for a given increment of reactor radius. Thus, in a nuclearly reactive assembly relatively far from the reactor center, the neutron flux may be appreciably greater at the radially inner side of the assembly than at the radially outer side thereof. This is particularly true of a blanket breeder assembly located in a radially outer region of a fast breeder reactor. So the plutonium produced at the inner side of the blanket assembly may be appreciably greater than at the outer side. In a fuel assembly the amount of burn-up and the fission products produced by the neutron flux may be appreciably greater at the inner side than at the outer side. These differences in the conditions at the inner and outer sides of blanket assemblies and fuel assemblies complicate the problem of management of the assemblies for recovery and reprocessing.

I propose to make the effects of the neutron flux relatively even from the radially inner side of a nuclearly reactive assembly to the radially outer side thereof by shifting the assembly angularly about its own axis during the operation of the reactor.

According to the invention, I accomplish such angular shifting by utilizing the flow of liquid coolant forced to flow over the nuclearly reactive assembly.

In the drawings:

FIG. 1 is a longitudinal sectional view of a nuclearly reactive assembly with a turbine attached thereto;

FIG. 2 is a longitudinal sectional view of a different nuclearly reactive assembly having spiral strips;

FIG. 3 is an elevational view of a modified form of the assembly of FIG. 2;

FIG. 4 is a longitudinal sectional view of still another nuclearly reactive assembly with a piston associated therewith;

FIG. 5 is an enlarged fragmentary longitudinal sectional view of the assembly of FIG. 4;

FIG. 6 is a transverse sectional view taken on the line 6—6 of FIG. 5; and

FIG. 7 shows how the flux varies across a reactor and one of the above nuclearly reactive assemblies.

As shown in FIG. 1, a nuclearly reactive assembly 10 comprises a plurality of shiftable spaced parallel elements 11 of considerable length, a turbine wheel 12 connected with the elements by a shaft 13, and a nonrotatable tube or can 14 housing the elements and turbine wheel. The elements 11 are connected to one another in a bundle and may take the form of rods, ribbons, or strips that are composed of nuclear fuel or blanket breeder material and have corrosion-resistant jackets. The bundle of elements 11 is mounted in the tube 14 on radial bearings 15 at the ends and middle of the bundle so as to be shiftable angularly about the axis of the tube or the assembly. The turbine wheel 12 is mounted in the tube 14 on a thrust bearing 16. Coolant flowing through the tube 14 turns the turbine wheel 12, which in turn shifts the bundle of elements 11 as a group angularly with respect to the tube 14.

The tube 14 is mounted in lower plates 17 and upper plate 18 of a reactor that may be of the power breeder type such as shown in Monson et al. Patent 2,961,393, dated Nov. 22, 1960. If in the present application the assembly 10 is of blanket breeder material, its construction may be like that shown in FIGS. 11 and 14 of the Monson et al. patent. If the assembly 10 is of nuclear material, is construction may be like that shown in FIGS. 7, 8, 10, 12 and 13 of the Monson et al. patent.

The nuclearly reactive assemblies of the Monson et al. patent are hexagonal in cross section so as to fit together with a relatively small amount of intermediate spaces. The nuclearly reactive assembly 10 of the present application, on the other hand, is circular in cross section, because the elements 11 rotate with respect to the tube 14, and so there will be more voids in a reactor constructed of assemblies like that of FIG. 1. There will be some disadvantages resulting from these voids. However, this is a small price to pay for the advantages gained in the use of rotatable nuclearly reactive assemblies.

As shown in FIG. 2, a nuclearly reactive assembly 19 comprises a central rod 20 and hollow cylinders 21 and 22 each provided with a corrosion-resistant jacket and composed of nuclear fuel or blanket breeder material. The rod 20 has a circular cylindrical exterior and is loosely surrounded by the hollow cylinder 21, to which it is joined by spiral wires 23. The cylinder 21 has a circular cylindrical interior and exterior and is loosely surrounded by the hollow cylinder 22, to which it is joined by spiral wires 24. The cylinder 22 has a circular cylindrical exterior and interior and is loosely surrounded by a nonrotatable can or tube 14. Spiral wires 25 are joined to the exterior of the cylinder 22 and nearly fit the tube 14. The rod 20 and cylinders 21 and 22 are rotatable or angularly shiftable as a unit with respect to the tube 14 by virtue of the mounting of shafts 26 and 27 on the ends of the rod 20 in a bearing 28 at the top of the tube 14 and in a thrust bearing 29 carried by a spider 29a near the lower end of the tube 14. Coolant flowing through the tube 14 is forced to follow the helical passages defined by the wires 23, 24, and 25 between the rod 20, cylinders 21 and 22, and the tube 14, and so causes the rod 20 and cylinders 21 and 22 to rotate or shift angularly as a unit with respect to the tube 14.

Reference is made to Evans et al. Patent 2,977,297, dated March 28, 1961, and particularly FIG. 15 thereof, for a disclosure of a reactor employing a nuclearly reactive assembly composed of a central rod and hollow cylinder loosely surrounding one another and the rod so that coolant may flow over and between the rod and cylinders.

As shown in FIG. 3 a nuclearly reactive assembly 30 is like assembly of FIG. 2 except that its tube or can 31 is rotatable and engages the spiral wires 25 on the outer hollow cylinder 22. The tube 31 is rotatably mounted by bearings 33 and thrust bearing 34 in upper and lower plates 18 and 17 of the reactor. All parts of the assembly 30 shift angularly about the axis thereof when coolant flows through the assembly.

It will be understood that the nuclearly reactive assembly 10 may also be modified in the manner of FIG. 3, that is, to mount the can 14 for rotation in bearings in the plates 17 and 18 and connect the can with the elements 11 and turbine wheel 12 so that all parts of the assembly 10 are moved angularly when coolant flows therethrough.

As shown in FIG. 4, a nuclearly reactive assembly 32 has a bundle of spaced parallel elements 11 much like those of FIG. 1, which bundle is rotatably mounted on a bearing 34a and a thrust bearing 34b in a nonrotatable can or tube 35, carried by lower and upper plates 17 and 18 of the reactor. The lower ends of elements 11 are supported by a grid 36, which is directly mounted in the thrust bearing 34.

A screw 37, which takes the form of a twisted bar, is fixed to the lower side of the grid and depends therefrom centrally of the tube 35. As shown in FIGS. 5 and 6, a nut 38 has a narrow transverse slot 39 which the screw 37 engages as it extends therethrough. The nut 38 may rest on a piston 40, as shown in FIG. 5, and when it does, teeth on the lower side of the nut engage teeth on the upper side of the piston so that the nut and piston cannot rotate relative to one another. The piston 40 is mounted on a plurality of circumferentially spaced keys 41 secured to the interior of the tube 35. As shown in FIG. 5, the piston 40 can move axially of the tube to a limited extent between a lower-full-line position and an upper-broken-line position determined by stop portions 42 on the keys 41. As shown in FIG. 6, the keys 41 engage grooves 43 on the piston 40, and thus the piston is prevented from rotating with respect to the tube 35. When the piston 40 is in its lower position, it has a relatively tight fit with a portion 44 of the tube 35 of relatively small diameter. When the piston 40 is in its upper position, it is located in a portion 45 of the tube 35 of greater diameter, at which portion there is a relatively wide annular space around the piston for the flow of coolant.

When the piston 40 is moved upward from its full-line position to its broken-line position of FIG. 5, the drag of the screw 37 on the slot 39 keeps the teeth on the nut 38 engaged with the teeth on the piston, so that the piston 40, being prevened from rotating, keeps the nut from rotating. Since the nut 38 does not rotate as it moves up along the screw 37, the screw, which along with the bundle of elements 11 is held against vertical movement, is forced to rotate and causes the bundle of elements 11 to rotate.

When the piston 40 moves down to its full-line position of FIG. 5, the drag of the screw 37 on the nut 38 causes the teeth on the nut to become disengaged from the teeth in the piston. So the nut 38 rotates on the screw 37 during its descent after the piston 40. Thus, the screw 37 and the bundle of elements 11 do not rotate at this time.

To sum up, the bundle of fuel elements 11 rotates while the piston 40 moves up and does not rotate while the piston moves down.

During normal reactor operation, the upward flow of coolant through the assembly 32 keeps the piston 40 at or near its broken-line position of FIG. 5, in which the coolant can flow through the relatively wide annular space between the piston 40 and the portion 45 of the tube 35. When the reactor is taken out of operation for replacement of certain fuel elements and the flow of coolant through the assembly 32 is stopped, the piston 40 and nut 38 move down to the full-line position of FIG. 5, without rotation of the elements 11. Now when the reactor is put back in operation, the resumption of coolant flow through the assembly 35 moves the piston 40 and nut 38 back up to the broken-line position of FIG. 5, with the result that the bundle of elements 11 of the assembly 32 rotates a small amount.

Thus, if the assembly 32 of FIGS. 4–6 is a blanket assembly of a breeder reactor such as the EBR–II, operated by Argonne National Laboratory near Idaho Falls, which reactor is shut down about every two weeks for replacement of some of the fuel assemblies, there will be a small angular shift of the blanket assembly to which the invention of FIGS. 4–6 is applied, every two weeks.

The effect of rotating the nuclearly reactive assemblies 10, 19, 30, or 32 in accordance with the present invention may be observed in FIG. 7. In the upper part of FIG. 7 a nuclear reactor is illustrated diagrammatically in plan. This reactor may be of the breeder type generally as disclosed in the aforementioned Monson et al. patent, cooled by fluid flowed lengthwise through the nuclearly reactive assemblies. Assume a nuclearly reactive assembly 10, 19, 30, or 32 located in an outer blanket portion 46 in the reactor whose center is designated by 47, and consider a region in the assembly, designated as 49, which region is near the periphery of the assembly and is located at its greatest distance from the reactor center 47 at the start of reactor operation. Now, as during the course of reactor operation the nuclearly reactive assembly is rotated or shifted angularly about its longitudinal axis, the region 49 moves in a circular path 50 and during such circular movement lies at various positions designated by 49a, 49b, 49c, 49d, and 49e which lie at various distances from the reactor center 47. The region 49 in the circular path just described is subjected to various values of neutron flux indicated by the projection of the different points on the path of the region to a curve at the lower part of FIG. 7 representing the values of neutron flux at various distances from the reactor center 47. Thus, the region 49 is subjected to values of neutron flux varying from a minimum value 51 to a maximum value 52 on a section 53 of the flux curve, and to an average value of neutron flux represented approximately by the midpoint on the section 53 of the flux curve.

Obviously any region that is displaced from region 49 but located on circular path 50 will also be subjected to about the same average value of neutron flux as region 49. The average value of a neutron flux striking any other region that is at a different distance from the axis thereof, i.e., is not on circular path 50, will also be represented approximately by the midpoint of the section 53 of the flux curve.

From this it can be seen that each region of any one reactive assembly, by means of rotation, is subjected to about the same average value of neutron flux. Thus with the rotation of nuclearly reactive assemblies during reactor operation, the amount of burn-up and the fission products produced by neutron flux in fuel assemblies, and the amount of fissionable material produced in breeder assemblies, are relatively even across the assembly, and so the management of nuclearly reactive assemblies for recovery and reprocessing is facilitated.

It is understood that the invention is not to be limited by the details given herein but that it may be modified within the scope of the appended claims.

The embodiments of the invention in which an exclusive property or privilege is claimed are defined as follows:

1. In a nuclear reactor comprising a nuclearly reactive assembly composed of a central rod, a first hollow cylinder loosely surrounding the rod, and a second hollow cylinder loosely surrounding the first hollow cylinders; and means for causing fluid under pressure to flow between the rod and the first cylinder and between the first and second cylinders for cooling the same; the combination therewith, of spiral spacers attached to and between the rod and the first cylinder and to and between the first and second cylinders for causing the fluid over the assembly to shift the same angularly about its own axis.

2. In a nuclear reactor comprising a nuclearly reactive assembly composed of a central rod, a first hollow cylinder loosely surrounding the central rod, a second hollow cylinder loosely surrounding the first hollow cylinder; a tube loosely surrounding the second hollow cylinder; and means for causing fluid under pressure to flow through the tube between the rod and the first cylinder, between the first and second cylinders, and between the second cylinder and the tube; the combination therewith, of spiral spacers attached to and between the rod and the first cylinder and to and between the first and second cylinders, and located between the second cylinder and the tube and attached to the second cylinder for causing the fluid flowing through the tube to shift the assembly angularly about its own axis.

3. In a nuclear reactor comprising a nuclearly reactive assembly, a nonrotatable tube housing the same, and means for causing fluid under pressure to flow through the tube over the assembly from one end thereof to the other for cooling the assembly, the combination therewith, of a guide secured in the tube adjacent the said one end of the assembly and having keys and end stops, a screw attached to said one end of the assembly, a nut engaging the screw and having teeth on one end, and a piston having teeth on one end engageable with the teeth on the nut and being mounted in the guide so as to have limited axial movement between the end stops of the guide while being prevented from rotating by the keys of the guide.

References Cited by the Examiner

UNITED STATES PATENTS

| | | | |
|---|---|---|---|
| 2,980,667 | 4/1961 | Coombs | 176—28 |
| 3,047,486 | 7/1962 | Hanson | 176—28 |
| 3,089,836 | 5/1963 | Wootton | 176—50 X |
| 3,230,146 | 1/1966 | Astley et al. | 176—21 X |

FOREIGN PATENTS

| | | |
|---|---|---|
| 609,326 | 11/1960 | Canada. |
| 1,200,880 | 7/1959 | France. |
| 922,498 | 4/1963 | Great Britain. |

REUBEN EPSTEIN, *Primary Examiner.*

UNITED STATES PATENT OFFICE
CERTIFICATE OF CORRECTION

Patent No. 3,281,325                                        October 25, 1966

Robert J. Hennig

It is hereby certified that error appears in the above numbered patent requiring correction and that the said Letters Patent should read as corrected below.

Column 2, line 14, for "is" read -- its --; column 3, line 34, for "prevened" read -- prevented --; column 4, line 59, after "fluid" insert -- flowing --.

Signed and sealed this 5th day of September 1967.

(SEAL)
Attest:

ERNEST W. SWIDER                                   EDWARD J. BRENNER
Attesting Officer                                        Commissioner of Patents